US006744045B2

(12) United States Patent
Fries et al.

(10) Patent No.: US 6,744,045 B2
(45) **Date of Patent: *Jun. 1, 2004**

(54) PORTABLE UNDERWATER MASS SPECTROMETER

(75) Inventors: David P. Fries, St. Petersburg, FL (US); Robert Timothy Short, St. Petersburg, FL (US); Robert H. Byrne, St. Petersburg, FL (US)

(73) Assignee: University of South Florida, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/971,119

(22) Filed: Oct. 4, 2001

(65) Prior Publication Data

US 2002/0079442 A1 Jun. 27, 2002

Related U.S. Application Data

(60) Provisional application No. 60/237,811, filed on Oct. 4, 2000.

(51) Int. Cl.[7] .......................... B01D 59/44; H01J 49/00
(52) U.S. Cl. ........................ 250/288; 250/281; 250/292
(58) Field of Search ................................ 250/281, 288, 250/292

(56) References Cited

U.S. PATENT DOCUMENTS 4,982,097 A * 1/1991 Slivon et al. ............... 250/288
5,192,865 A * 3/1993 Zhu ........................... 250/288
5,871,336 A * 2/1999 Young ........................ 417/207
6,100,522 A * 8/2000 Chiang ....................... 250/288
6,351,983 B1 * 3/2002 Haas et al. ................ 73/23.37

OTHER PUBLICATIONS

Fries et al., "In–Water Field Analytical Technology: Underwater Mass Spectrometry, Mobile Robots, and Remote Intelligence for Wide and Local Area Chemical Profiling," Field Analytical Chemistry and Technology, vol. 5(3), pps. 121–130, John Wiley & Sons, Inc., 2001.

Short et al., "Development of an Underwater Mass–Spectrometry System for in situ Chemical Analysis," Measurement of Science Technology, vol. 10, pps. 1195–1201, 1999.

Short et al., "Underwater Mass Spectrometers for in situ Chemical Analysis of the Hydrosphere," J Am Soc Mass Spectrom, vol. 12, pps. 676–982, Elsevier Science Inc., 2001.

"Analytical Task Force for the Assessment of the Chemical Threat in Case of Accidents and Disasters," Matz, et al., presented at the 12$^{th}$ Sanibel Conference on Mass Spectrometry, Field–Portable and Miniature Mass Spectrometry, pps. 163–174, Jan. 22–25, 2000.

* cited by examiner

*Primary Examiner*—John R. Lee
*Assistant Examiner*—Paul M. Gurzo
(74) *Attorney, Agent, or Firm*—Anton J. Hopen; Molly L. Sauter; Smith & Hopen, P.A.

(57) ABSTRACT

A portable mass spectrometer for underwater use includes a watertight case having an inlet and means for transforming an analyte gas molecule from a solution phase into a gas phase positioned within the case. Means for directing a fluid to the transforming means from the inlet and means for analyzing the gas-phase analyte molecule to determine an identity thereof are also positioned within the case.

44 Claims, 15 Drawing Sheets

PORTABLE UNDERWATER MASS SPECTROMETER

CROSS-REFERENCE TO RELATED APPLICATION

This application claims priority to provisional application No. 60/237,811, "Underwater Quadrupole Mass Spectrometer," filed Oct. 4, 2000.

GOVERNMENT SUPPORT

This invention was developed under support from the Office of Naval Research under grant N00014-98-1-0154; the U.S. government has certain rights in the invention.

BACKGROUND OF THE INVENTION

1. Field of the Invention

The present invention relates to portable devices and methods for performing in situ chemical analysis of aqueous environments, and, more particularly, to such devices and methods for performing mass spectrometry.

2. Description of Related Art

Mass spectrometry (MS) is known to be a versatile and powerful chemical sensing technique. In all known mass spectrometers analytes are transported from their normal state (e.g., solid phase or solution) into the vacuum of the MS through a sample interface. After entering the vacuum system, ionized analytes are then dispersed according to their mass-to-charge ratio (m/z) by some combination of electrical and magnetic fields. The ion signal is recorded as a function of m/z, typically using a high-gain electron multiplier or Faraday-cup detector. Measured intensities for each m/z result in the mass spectrum and can often be related to the concentration of the analyte in the original sample, or possibly be used for identification of unknowns in a complex mixture. Certain types of mass spectrometers allow multiple stages of mass spectrometry (K. L. Busch et al., *Mass Spectrometry/Mass Spectrometry: Techniques and Applications of Tandem Mass Spectrometry*, VCH, New York, 1988; C. Feigel, *Spectroscopy* 9, 31–40, 1994); two-stage analysis is denoted tandem mass spectrometry (MS/MS). Tandem mass spectrometry is typically accomplished by selecting ions of a particular m/z in the first stage of the MS and allowing them to collide with a gas target. The molecular fragments created in these energetic collisions are then analyzed according to their m/z in the second stage of the MS. The fragment mass spectrum can be used to deduce molecular structure and to provide more positive identification of chemicals in complex samples.

Although prior known mass spectrometers have been large laboratory instruments, smaller portable systems have become available, including those intended for use in harsh environments (C. M. Henry, *Anal Chem.* 71, 264–68A, 1999).

Remotely operated vehicles (ROVs) and autonomous underwater vehicles (AUVs) offer an attractive means for obtaining data in harsh underwater environments. These systems impose fairly stringent size and power constraints, with current devices limited to power supplied by 48 Vdc batteries for approximately 4 h, diameters less than 1 m, and lengths of approximately 2 m. An ROV-based submersible gas chromatograph-mass spectrometer (GCMS) system with automated membrane introduction was described in an article by G. Matz and G. Kibelka. The submersible GCMS system uses a large ion pump and is a significantly larger instrument than the portable instrument of the instant application, requiring a crane to lift, and having a shorter effective operation time in the field.

Some of the challenges faced in creating underwater mass spectrometry systems are related to the necessity of performing mass spectrometry in a vacuum (of the order of $10^{-5}$ Torr). Analytes must be transported from the aqueous environment into a vacuum system, underwater. Since analysis of aqueous samples inevitably increases gas loads on vacuum pumps, use of entrainment or capture pumps would require frequent regeneration. Alternatively, if throughput pumps are used in a closed system, the inevitable increase in exhaust pressure of these pumps would eventually degrade pump operation. Since ambient underwater pressure increases by approximately 1 atm with 10-m depth increments, regeneration of entrainment pumps or decompression of pump housings becomes impractical at substantial depths.

There are additional challenges related to the desire to analyze these analytes, which may be present over a large range of concentrations (e.g., from 1 M for Na and Cl to $10^{-14}$ M for Au and Bi in the ocean) and in a variety of states (e.g., volatile, involatile, and complexed). For example, no single configuration of mass spectrometer is useful for analysis of this extremely wide range of compounds.

Thus there remains a need in the art for underwater mass spectrometer systems that is versatile, portable, and able to operate for a sustained period underfield conditions.

SUMMARY OF THE INVENTION

It is therefore an object of the present invention to provide an integrated mass spectrometer adapted for underwater operation.

It is an additional object to provide such a spectrometer that is autonomous.

It is a further object to provide such a spectrometer that is portable.

It is another object to provide such a spectrometer capable of performing mass-spectral analysis of a wide variety of chemical species.

It is yet an additional object to provide such a spectrometer adapted for detection of volatile analytes dissolved in a fluid.

These objects and others are achieved by the present invention, a portable mass spectrometer adapted for underwater use. The device comprises a watertight case having an inlet and means for transforming an analyte molecule from a solution phase into a gas phase positioned within the case. Means for directing a fluid to the transforming means from the inlet and means for analyzing the gas-phase analyte molecule to determine an identity thereof are also positioned within the case.

This system and method enable in situ underwater chemical analysis at a depth of at least 30 m with ppb detection limits for some volatile organic compounds (VOCs) and dissolved gases, such as those of interest to regulatory agencies and marine science. Alternative embodiments provide broader analytical access to chemical species in the water column. Future embodiments are planned, including networks of underwater vehicles capable of tracing chemicals, both natural and anthropogenic, to their sources (D. P. Fries et al., "In-Water Field analytical Technology: Underwater Mass Spectrometry, Mobile Robots, and Remote Intelligence for Wide and Local Area Chemical Profiling," *Field Analytical Chemistry and Technology* 5(3): 121–30, 2001).

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
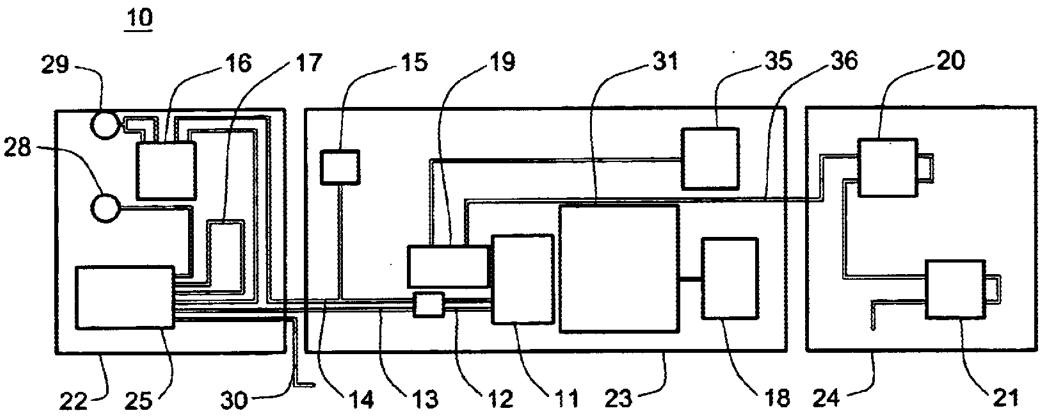
FIG. 1 is a schematic diagram of an exemplary layout of the mass spectrometer of the present invention.

A description of the preferred embodiments of the present invention will now be presented with reference to FIGS. 1–13.

Portable Underwater Mass Spectrometer

The detection of organic vapors, such as VOCs and dissolved gases, is an important technique for purpose of, for example, evaluating potential health hazards. The transformation of such substances from the solution phase into the gas phase is known to be accomplished, for example, by membrane introduction. This method is based on solubility principles of membranes such as polydimethylsiloxane (PDMS), which selectively transports nonpolar volatile compounds. Highly polar compounds, such as water, do not migrate through the PDMS membrane with appreciable efficiency. Consequently, small membranes provide an effective interface between the water column and the vacuum system of a mass spectrometer and, furthermore, result in a concentration of volatile species in the mass spectrometer. This concentration enhancement provides very low detection limits for many low-relative-molecular-mass volatile compounds using membrane-introduction mass spectrometry (MIMS). Compounds with relative molecular masses in excess of 300 amu do not pass through the membrane with sufficient efficiency to be detected. Polar compounds can, in principle, also be investigated using ion-exchange membranes such as Nafion.

A first aspect of the system 10 of the present invention (FIG. 1) comprises an introduction probe 12 (MIMS Technology, Inc., Palm Bay, FLA). The probe 12 comprises a small PDMS capillary approximately 0.01 m long and 0.001 m in diameter connected to two stainless steel tubes 13,14. Water flowing into the PDMS capillary can be heated in one of the tubes 13,14 to a predetermined temperature, typically 30–60° C. here. Temperature regulation is accomplished using a temperature controller 15 (Omega, Model CN491A-D1), which controls the current to two embedded heater cartridges using feedback from a temperature sensor in the heater block of the probe assembly.

The fluid control system that is used to alternatively direct deionized water and sample water to the membrane interface comprises a multichannel peristaltic pump 16 (Pump Express/ALITEA AB, Chicago, Ill.) and a two-position six-port rotary switching valve 25 (Valco Instruments, Co., Houston, Tex). In an exemplary embodiment, narrow-bore PEEK tubing (Upchurch Scientific, Inc., Oak Harbor, Wash.) is used for component interconnections of the fluidic system. The peristaltic pump 16 is used to direct both deionized water and sample water through the system at a nominal rate. Rates are typically 0.5 to 1.0 mL/min.

Two types of fluidic-control systems have been employed: flow injection and fluid stream switching. (R. T. Short et al., "Underwater Mass Spectrometers for in situ Chemical Analysis of the Hydrosphere," *J. Am. Soc. Mass Spectrom.* 12, 676–82, 2001). These systems involve the use of two different types of dual-position multiport switching valves. Both systems allow comparison of sample analyte intensities and background intensities by alternately introducing sample and deionized water to the membrane.

A flow injection system (VICI Valco Instruments Co., Model EHMA) can be used to introduce reproducible volumes (here 1.2 mL, although different volumes can be obtained using this system) of samples into the MIMS probe 12. The flow injection system utilizes a six-port rotary switching valve 25 that contains a 1.2-mL sample loop 17. The loop continuously fills off-line, with periodic switching in-line to allow the loop contents to pass through the membrane capillary. "Blank" deionized water may be directed to flow through the system 10 so that mass spectra from the samples may be compared with the background of residual gas in the vacuum system. Two separate channels from a three-channel peristaltic pump 16 (Pump Express SX-MINI, Model 100-051) are used to pump water through the membrane capillary and fill the 1.2-ml sample loop 17 of the flow injection system. Flow rates of 0.5–1.0 ml/min are typical.

Figure 1A:
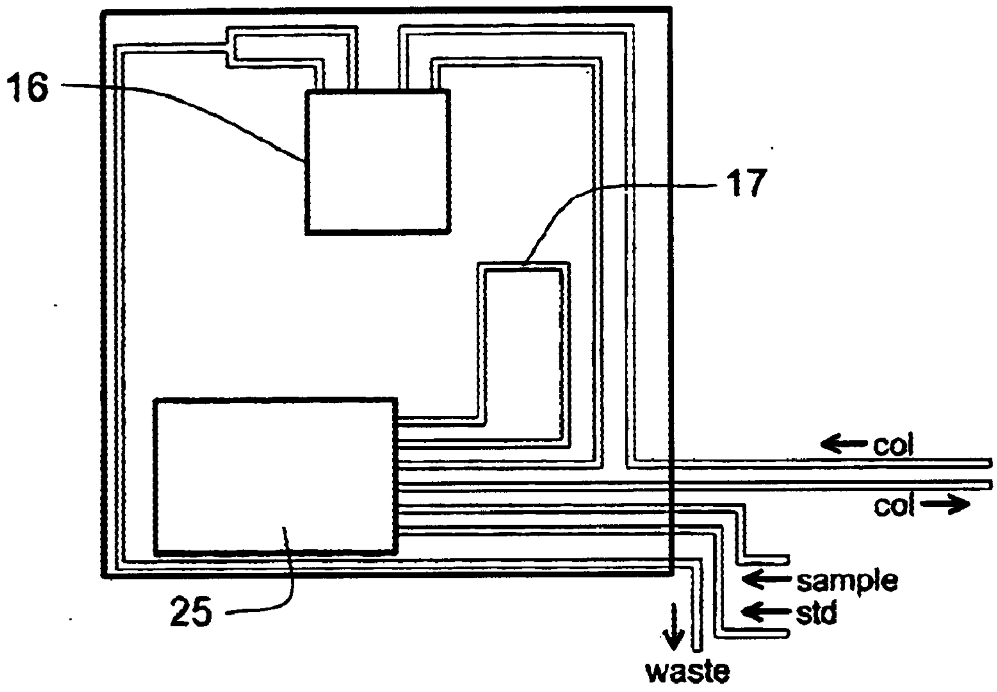
FIGS. 1A,1B are schematic diagrams of alternate flow-injection systems.
Figure 1B:
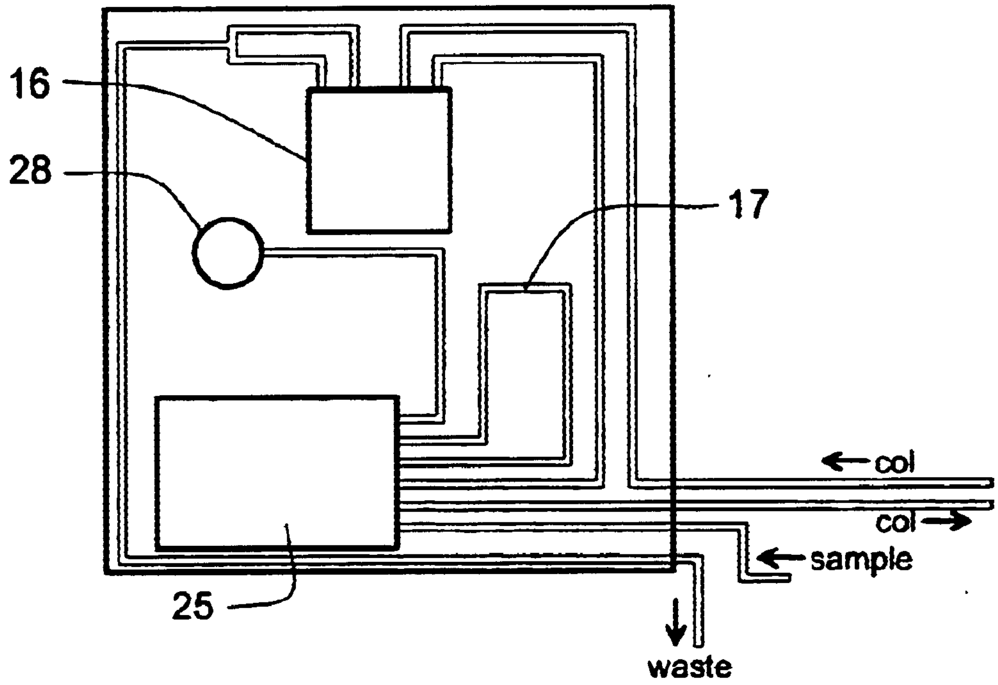

Two alternate embodiments of this flow-injection system are illustrated schematically in FIGS. 1A and 1B, comprising, respectively, a six-port valve controller 25 with a sample loop 17 but no deionized water reservoir and a six-port valve controller 25 with an internal deionized water reservoir 28.

Figure 1C:
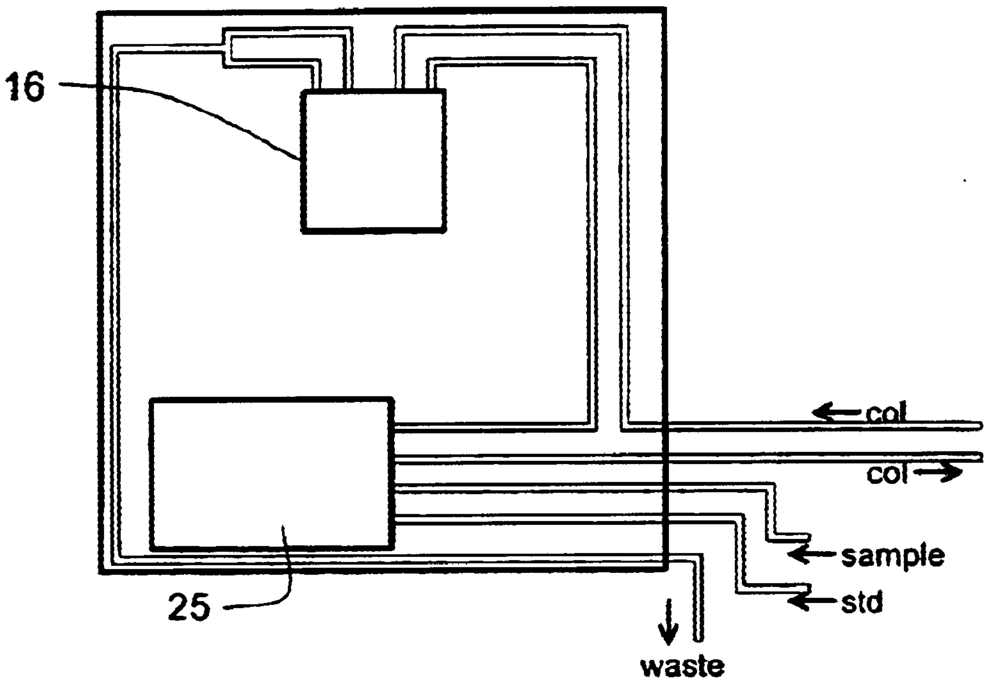
FIGS. 1C,1D are schematic diagrams of alternate fluid stream switching systems.
Figure 1D:
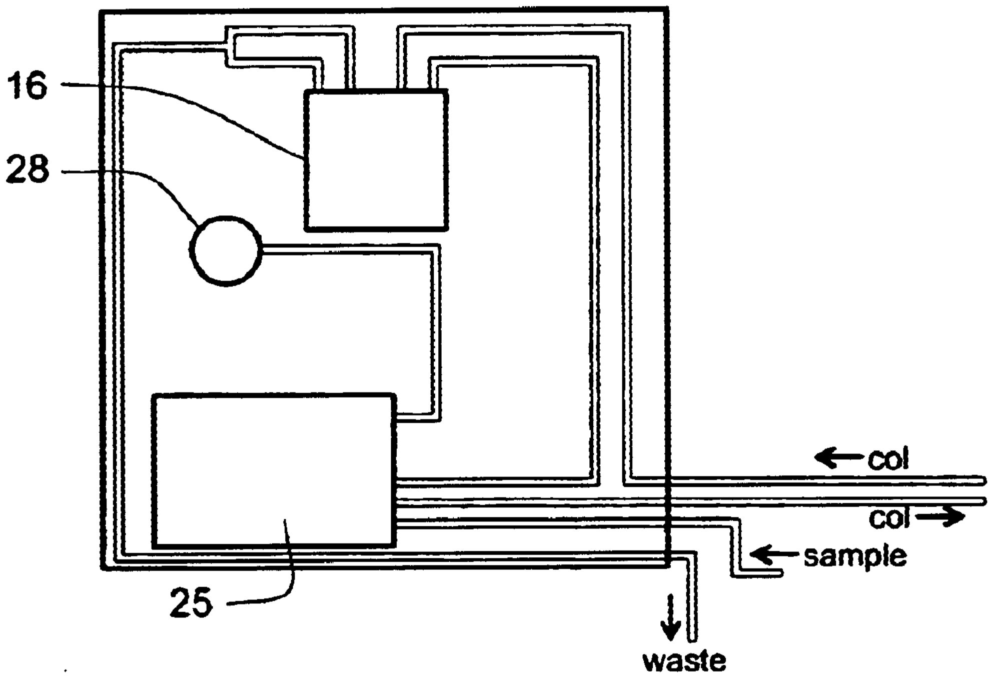

A fluid stream switching system that does not have a sample loop can also be utilized, allowing a more flexible method to introduce samples. Two alternate embodiments of this system are illustrated schematically in FIGS. 1C and 1D, each comprising a dual-position four-port valve controller 25'. The four-port valve controller 25' allows sample water and deionized water to be alternately directed to the membrane interface in the case of FIG. 1D, which has a deionized water reservoir 28. In FIG. 1C, which has no internal deionized water reservoir, the valve controller 25' allows sample water and an external standard to be alternately directed to the membrane interface. In this flow system, the volume of the introduced sample is determined by the pumping speed and the time that the valve remains in position. The advantage of this procedure is that the volume of the sample introduced to the analyzer can be varied over a continuous range and optimized for each analysis (without change of hardware). Additional sample introduction methods that would be known to those of skill in the art can also be employed.

The system 10 (FIG. 1) further comprises a small linear quadrupole mass filter 11 (Leybold Inficon Transpector gas-analysis system, Syracuse, N.Y.), an exemplary component chosen for its small size, lightweight, and inexpensiveness. The mass filter 11 is adapted to the probe 12. The vacuum housing for the mass filter 11 is designed to ensure that compounds entering the vacuum system from the membrane pass through the quadrupole-mass-filter electron-impact ionization source before diffusing into the vacuum chamber. The quadrupole mass filter 11 can provide full mass scans for the entire 1–100 amu operational range, or it can monitor selected ion masses as a function of time. The latter mode is normally used for membrane-introduction analysis. The quadrupole mass spectrometer 11 is powered by 24 V dc and communicates with a computer 18 via an RS-232 port. Power consumption is of the order of 24 W. In a test laboratory system, data acquisition and control have been accomplished using a laptop computer (Dell, Latitude CPiD233st). A deployable embodiment comprises an embedded Cell Computing CardPC computer having a 144-MB disk on a chip. This computer 18 operates on 5 V dc and consumes a maximum of 5.3 W during routine operation.

Vacuum in the quadrupole mass-filter housing is provided by a turbo-molecular drag pump 19 (Varian, Model V70LP) backed by two diaphragm pumps 20,21 (K N F Neuberger, Inc., Model N84.0-11.98, Trenton, N.J.) connected in series. Other throughput pumps that can exhaust into evacuated housing can be utilized, as would be apparent to someone skilled in the art. The turbo-pump controller and the brushless-motor diaphragm pumps 20,21 are both powered by 24 V dc and consume on the order of 45 W during normal operation. The drag pump 19 has a high compression ratio and requires a backing pressure of only approximately 1 Torr, which is provided by the series of diaphragm pumps 20,21. The vacuum in the mass-filtering housing is approximately $10^{-6}$ Torr without the membrane-introduction probe 12 and around $10^{-5}$ Torr with the membrane probe 12 connected and water flowing through the membrane capillary.

Figure 12:
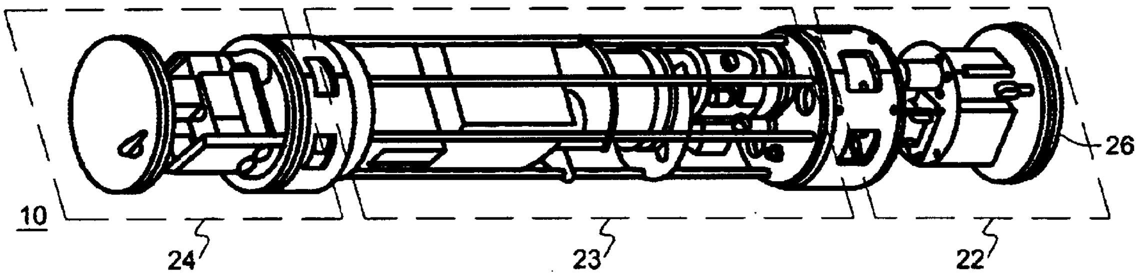
FIG. 12 is a schematic of a three-pressure-vessel system for the underwater membrane-introduction quadrupole mass filter system.

The pressure-vessel housing of the various MS system 10 components separates and packages the components in three different pressure vessels 22–24 (FIGS. 1 and 12). The modular three-pressure-vessel approach was chosen for several reasons. Such a modular approach allows components that may be used in more than one configuration to be directly adapted to other variations of in situ mass spectrometers. For example, the fluidic control pressure vessel 22 could be adapted to any MS, and the diaphragm-roughing pump pressure vessel 24 will not require any changes when connected to other MS vacuum systems. Each of the pressure vessels 22–24 has a maximum diameter in the present embodiment of 0.019 m in order to be readily compatible with the physical constraints of smaller AUV platforms.

Figure 2:
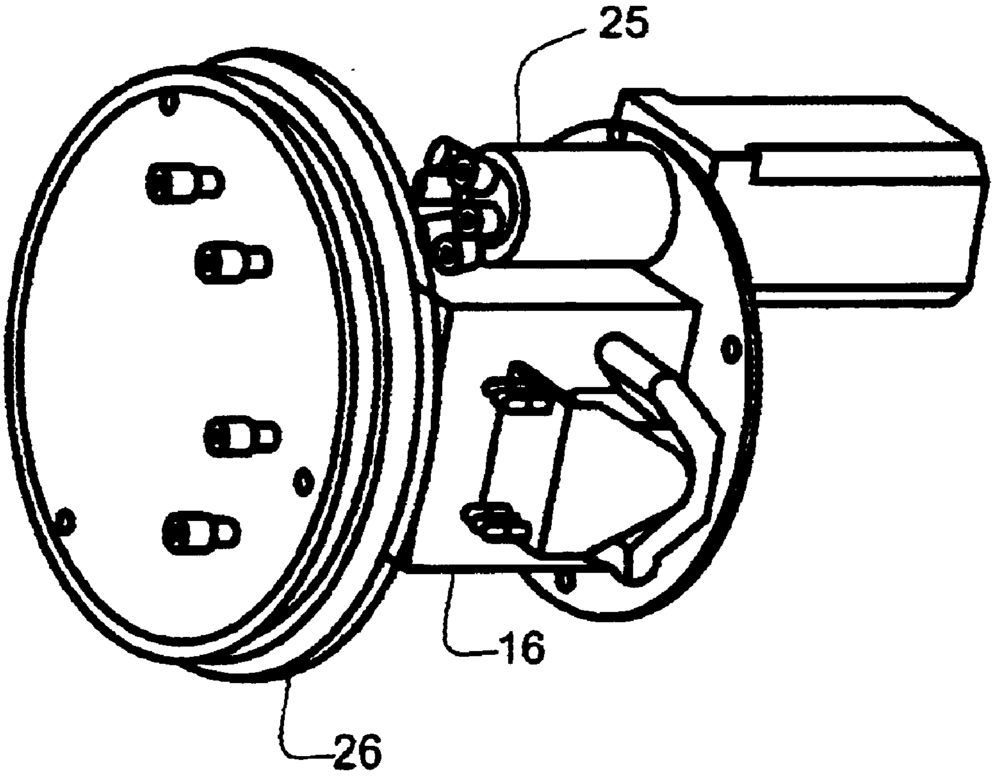
FIG. 2 is a side perspective view of the pressure-vessel mounting of flow injection components.
Figure 3:
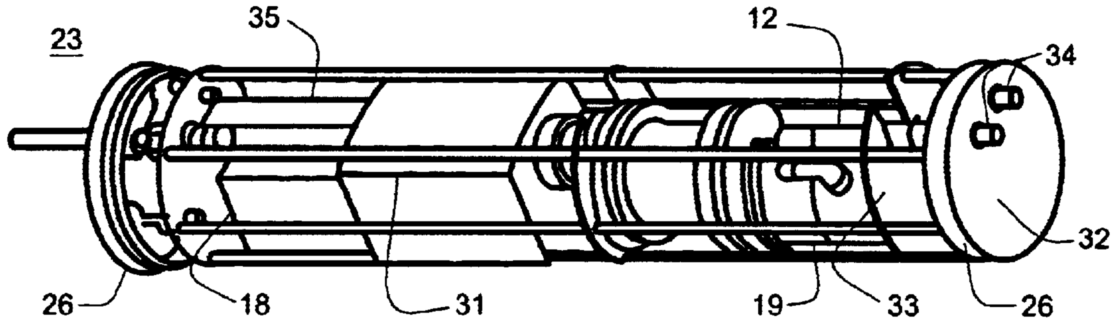
FIG. 3 is a side perspective view of the pressure-vessel mounting of the primary components of the mass spectrometer system.

The fluid-control components, including a three-channel peristaltic pump 16 and the two-position six-port rotary switching valve 25, are mounted to the front endcap 26 of the fluid-control pressure vessel 22 (FIG. 2). A first collapsible bladder 28 contains "blank" deionized water; a second 29 contains the "waste" water (FIG. 1). These bladders 28,29 are used to keep the pressure inside the closed pressure vessel 22 as constant as possible; there will be a slight increase in overall volume in the bladders 28,29 owing to the periodic introduction of 1.2-ml samples from the outside-water column. Sample scan range anywhere from 1 mL to continuous sampling. An alternative embodiment, such as in FIGS. 1A–1D, would not use a second bladder for "waste" water but allow the "waste" water to efflux into the environment. In another alternative embodiment the bladder (s) are contained external to the pressure vessel in order to facilitate exchange/refill, such as in FIGS. 1A and 1C.

In an exemplary environment of shallow-water operation (i.e., ≦30 m depth), the maximum water pressure is approximately three times atmospheric pressure. Sampling the water column at high pressures poses a potential problem for the membrane-introduction interface. Diffusion rates across the membrane depend on the pressure gradient thereacross, and there is the possibility of rupturing the membrane at higher pressures. The sample loop 17, which will be continuously filled during operation, and the fluid line that connects the two-position six-port rotary switching valve 25 to the sample-inlet port 30 on the endcap 26 comprise, in an exemplary embodiment, PEEK tubing and fittings (Upchurch Scientific, Inc.). These components are chemically inert and are designed to handle high-pressure liquids.

In the flow-injection arrangement, atmospheric-pressure deionized water normally flows through the membrane capillary. Upon sample introduction, small volumes, in this case 1.2-ml slugs, of higher-pressure water samples are introduced into the fluid line 13 and swept to the membrane probe 12. This embodiment is, of course, intended to be exemplary, and one of skill in the art will recognize that different sample loops, or none, may also be used. Pressures up to 4 times atmospheric have been tested. When the 1.2-ml sample is introduced by the flow-injection valve into the fluid line to the membrane probe 12, this line experiences a negligible increase in pressure; the pressure in the sample slug is absorbed by the large flexible reservoir of deionized water. Sampling at extreme depths poses more challenging problems.

An additional benefit derived from separating the fluid control system is that it isolates these multiple fluid connections from sensitive electronic components in the primary MS housing, thereby minimizing potential damage from small water leaks.

The central pressure vessel 23 contains the membrane probe 12, the quadrupole mass filter 11 with its vacuum housing plus associated electronics 31, the turbo pump 19 and its controller 35, and the computer 18. The turbo pump 19 is mounted (FIG. 3) through an aluminum heat sink to the front endcap 32. Dissipation of heat generated by the vacuum pumps can be readily accomplished by using heat sinks to the walls of the pressure vessels, which will be surrounded by water during operation. A small fan can be used to circulate the air inside the housing.

The central pressure vessel, or mass-spectrometer pressure vessel, 23 has interfaces 34 on the front endcap 32 for introduction of samples into the membrane probe 12 from the fluid-control pressure vessel 22, electrical feedthroughs for battery power and feedthroughs for computer Ethernet, keyboard, mouse, and monitor interfaces for diagnostic testing. The turbo-pump 19 exhaust is transported through a vacuum hose 36 into the roughing-pump pressure vessel 24.

Figure 4:
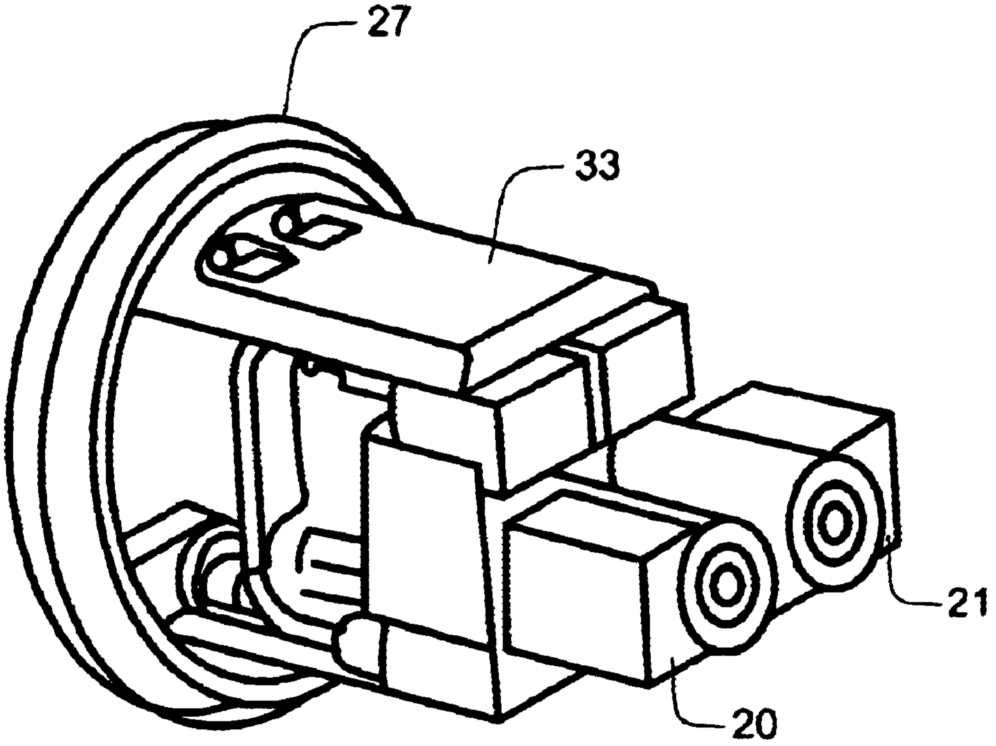
FIG. 4 is a side perspective view of the pressure-vessel mounting of the roughing pumps.

The system's diaphragm pumps are also housed in a pressure vessel separate from the MS system. A dedicated pressure chamber extends the endurance of the underwater vacuum system for time series deployments. The diaphragm roughing pumps 20,21 are mounted on the front endcap 27 of the third pressure vessel 24 (FIG. 4). The exhaust from the turbo pump 19 is connected to the diaphragm-pump system through this endcap 27. The diaphragm pumps exhaust directly into their pressure housing. Although the gas throughput from the high-vacuum region is minimal after the vacuum housing is pumped down, the pressure inside the closed rough-pumping system will eventually exceed an effective operational level. Thus the two major considerations in operating the roughing pumps 20,21 in a closed pressure vessel are heat dissipation and exhaust buildup. These issues have been successfully addressed in the present system 10.

Heat generated by the diaphragm pumps 20,21 is satisfactorily dissipated into the marine environment. Thermal coupling of the pumps to the pressure vessel endcap effectively dissipates heat generated during operation. Heat generated by the diaphragm pumps 20,21 is satisfactorily dissipated by adding aluminum heat-sink plates 33 from the roughing pump pressure vessel 24 housing to the endcap 27. Initial tests of pump operation in a closed pressure vessel (without the heat-sink plates) demonstrated the need for heat dissipation. Thermocouples mounted inside the pressure vessel indicated that the ambient temperature inside the roughing pumping pressure vessel 24 reached a steady-state value of 40° C., while the pump housing and motor attained equilibrated values of 71 and 66° C., respectively. Examination of the pumps 20,21 after the test revealed signs of deterioration of the diaphragm material. After adding the heat-sink plates, an ambient temperature of 35° C. was achieved for steady-state operation, the pump housing and motor reaching only 37 and 42° C., respectively.

Typical operation of roughing pumps allows them to exhaust at atmospheric pressure. If the pressure at the exhaust port is significantly greater than 1 atm, the pumping efficiency goes down, and, in some cases, the pumps do not work at all. This is naturally a concern in a closed pressure vessel that is submerged in water at higher than atmospheric pressure. Gas-throughput calculations, however, indicate that the problem is not severe for limited-duration operations, such as 8 h or less. For example, if the MS vacuum housing is evacuated to $10^{-5}$ Torr or less prior to sealing the diaphragm-pump pressure vessel, then the gas throughput of the 70 l/s turbo-pump and diaphragm-pump system results in only a 3% rise in pressure (from 760 to 783 Torr) in a 1-l pressure vessel over an 8-h period. In this manner, the operation of a closed system is demonstrated that was submerged in a container of water for more than 8 h. Operation was extended to at least 24 h by evacuating the pressure vessel to around 200 Torr at the beginning of the test. Additional testing demonstrated the operation of the system for two (2) weeks. These tests demonstrate that maintenance of an underwater vacuum system for periods of time well in excess of the 4 h typical of AUV operation is feasible.

Means of decompressing a pressure vessel have also been demonstrated at depths as great as 100 m using a pump (Pumpworks, Inc., Model PW-2000, Plymouth, Minn.). This technique is contemplated for use in longer-term operation, such as with a moored underwater MS system.

Analysis Using the Portable Underwater Mass Spectrometer

Tests were undertaken on the system 20 of the present invention for detection limits of VOCs as an exemplary case, such as benzene, toluene, and trichloroethane. Naturally occurring substances such as dimethylsulfide (DMS) are also amenable to detection and are of interest to the oceanographic and atmospheric communities.

Figure 5:
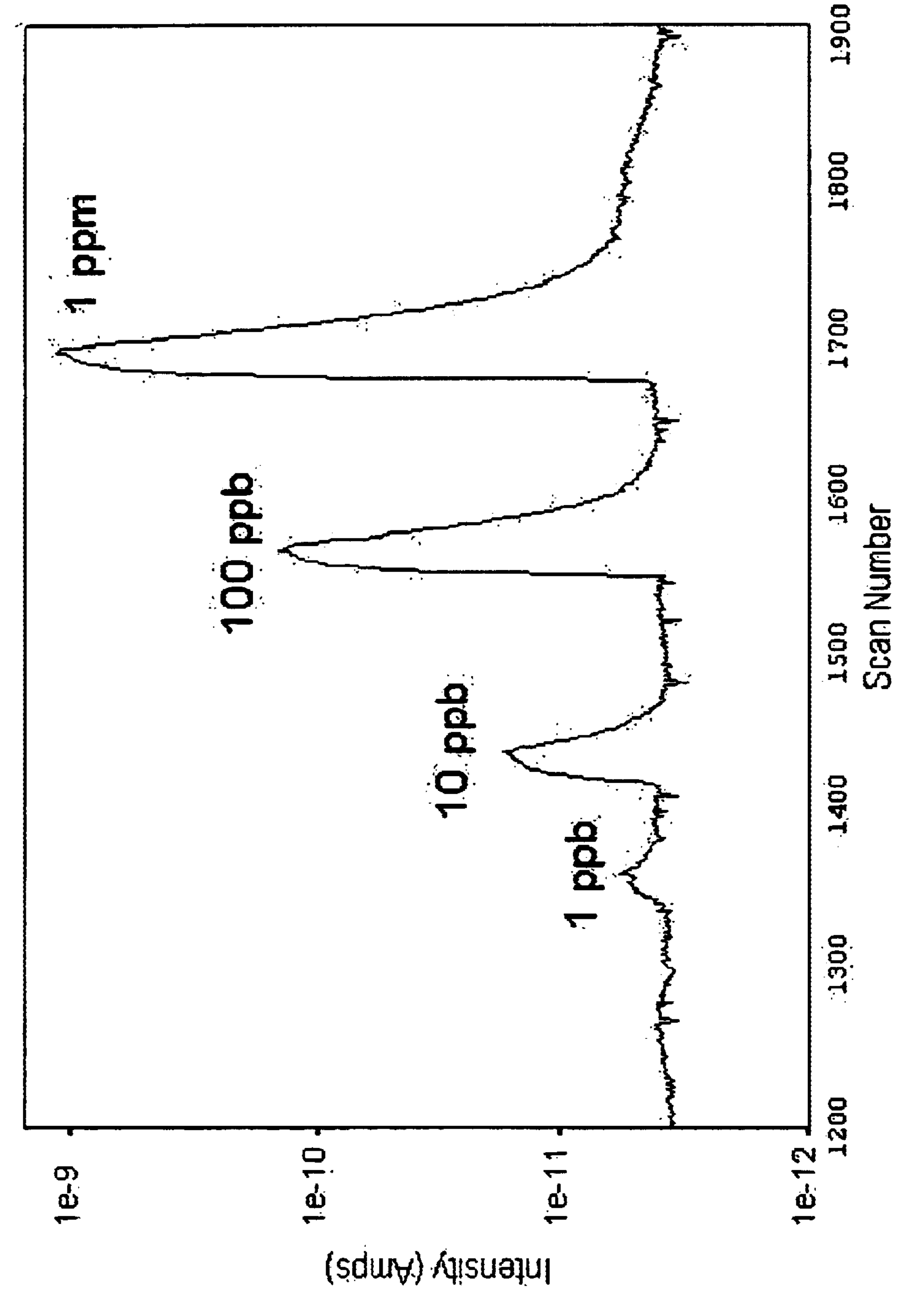
FIG. 5 shows data for the flow-injection analysis of toluene using a quadrupole mass spectrometer system, a first embodiment of the system of the present invention.

Data from a series of flow-injection MIMS analyses taken by the system 10 are given in FIG. 5. A series of 1.2-ml samples of toluene (Mallinckrodt Chemical, Inc., Paris, Ky.), diluted in seawater to concentrations of 1, 10, and 100 ppb and 1 ppm were analyzed; pure deionized water otherwise flowed through the membrane capillary. The mass filter was set a to monitor mass (m/z) 91, corresponding to the most intense diagnostic ion for toluene. Each data point represents the average reading of the ion current for a period of 0.512 s and is plotted on a vertical logarithmic scale. Each scan takes approximately 15 s. The electron-multiplier detector used for these measurements produced a range of intensities of two and a half orders of magnitude on going from 1 ppb to 1 ppm, indicating that some saturation occurs at the higher concentrations. These laboratory measurements demonstrate that an approximately sub-1-ppb detection limit for toluene is achievable with the system 10. The analysis time for each sample is largely dependent upon the time of diffusion across the membrane and is of the order of 5 min for VOCs. Less-volatile compounds may require longer times between injections. The reproducibility of MIMS analyses is typically better than 5% relative standard deviation (RSD) and often better than 1% RSD.

Figure 6:
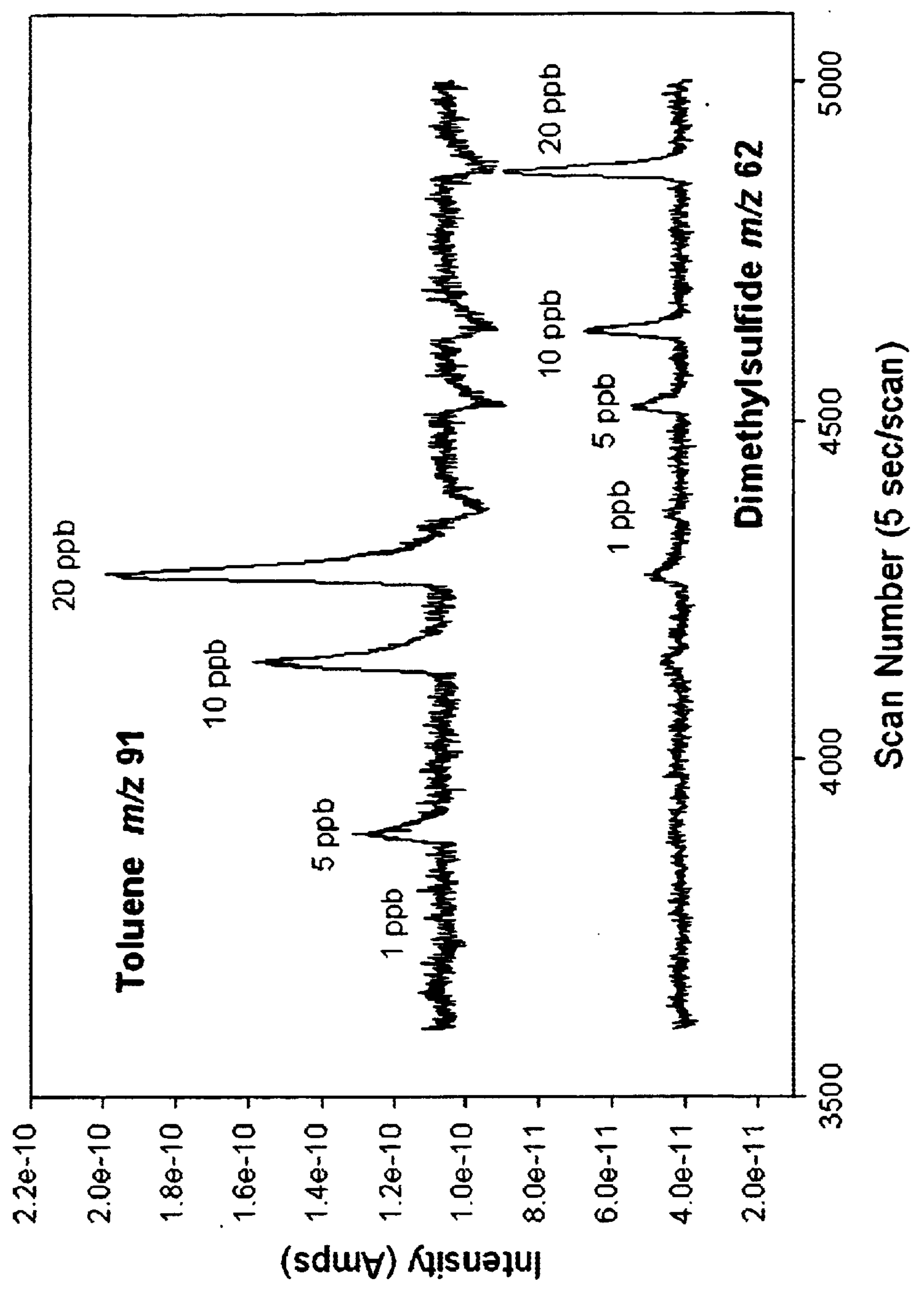
FIG. 6 plots laboratory data from an analysis of standards using the underwater quadrupole MS system. Concentrations noted in the diagnostic ion traces correspond to flow-injections analyses of 1-ml solutions of toluene and dimethylsulfide.

The performance of the system 10 was also evaluated in the laboratory using deionized water solutions of VOCs at known concentrations. Previous measurements comparing analyses of deionized water and seawater produced no membrane introduction matrix effects. FIG. 6 shows results from flow injection analyses of solutions containing toluene and dimethylsulfide (DMS). One-ml samples with analyte concentrations of 1, 5, 10, and 20 ppb were analyzed. Data for the major diagnostic ions (m/z 91 for toluene and m/z 62 for DMS) demonstrate that both compounds were clearly detectable at 5 ppb. Furthermore, at 1 ppb DMS was detectable with a signal-to-noise ratio of approximately 2:1.

Background intensities, typically attributed to the residual gas in the vacuum system, were higher for m/z 91 than for m/z 62. In this case, background contributions were also present from the deionized "blank" water. Contamination of the deionized water was evidenced by a decrease in m/z 91 intensity (in the last 4 injections) during analysis of DMS solutions, which were made using uncontaminated water. It was later confirmed that this contamination came from the medical-grade silicone flexible bag used to contain the deionized water. In a current embodiment Tedlar bags (Cole Palmer, Vernon Hills, Ill.) are used, as these do not introduce contaminants into the deionized water. Use of uncontaminated deionized water lowered the toluene detection limit to approximately 1 ppb. A minor m/z 62 fragment of toluene was also detectable in analyses of the higher-concentration (10 and 20 ppb) standards. These results accentuate the limitation of single-stage mass spectrometry (particularly, selected ion monitoring) for analysis of complex samples.

Figure 7:
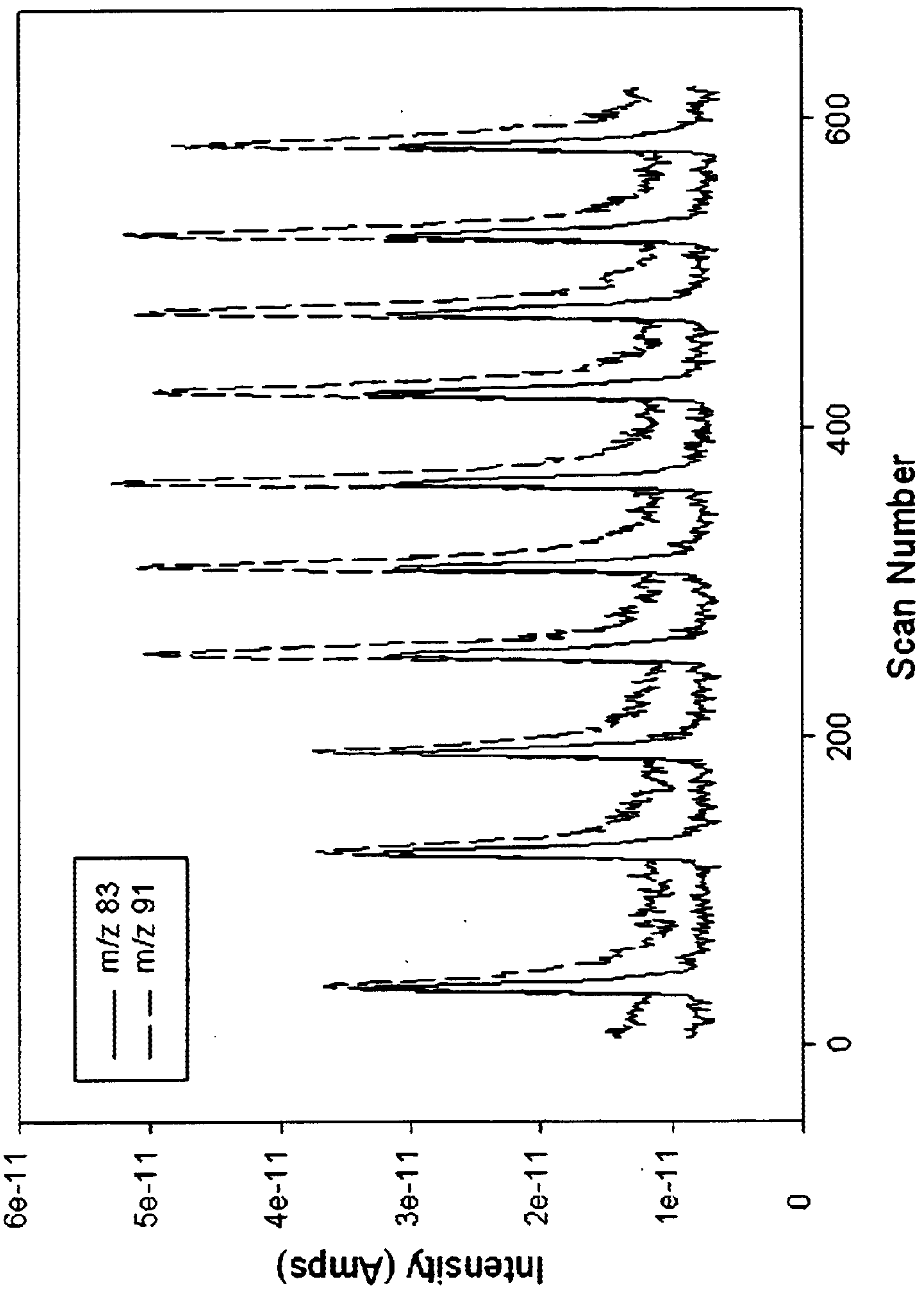
FIG. 7 plots in situ data from the quadrupole MS system immersed in a large tank of municipal water. The m/z 83 ion is a diagnostic of chloroform, and the m/z 91 ion is diagnostic of toluene. The increase in m/z 91 during the fourth flow-injection analysis corresponds to 3 ml of toluene added to the 30,000 liters of tank water. Each scan represents a 16-s analysis cycle.

Underwater tests of the system 10 were performed in a large water tank at the University of South Florida Center for Ocean Technology (COT). The tank was filled with approximately 30,0001 of municipal water. The quadrupole MS system was suspended in the tank at a depth of approximately 0.5 m. Waterproof cables were connected to provide 24 Vdc system power and real-time monitoring of data. Operation of the flow-injection valve was accomplished using a wireless keyboard and mouse near the side of the water tank. FIG. 7 displays the in situ data obtained for two monitored ion masses, m/z 83 and m/z 91. The peaks in the data correspond to repetitive flow injection analysis of tank water. Each data point (scan number) represents a 16-s cycle interval. Total analysis cycles were approximately 15 min to allow ion traces to return to background level. The m/z 83 peaks correspond to chloroform, which is routinely found in St. Petersburg, Fla., domestic water. This represents a concentration on the order of 50 ppb (determined by comparison with standards having known concentrations). Minor diagnostic ions of chloroform are not shown, but were also present in these analyses. The m/z 91 data correspond to toluene, which is not normally found at this level in domestic water. We attribute the initial presence of toluene in injected samples to contamination from previous activities in the water tank and outgassing of the tank walls.

To demonstrate the sensitivity and response time of the in situ MS, a 3% toluene/methanol solution (3 ml of toluene in 97 ml methanol) was added to the tank water approximately 5 m from the inlet of the mass spectrometer. The addition occurred between the third and fourth sampling cycles in the series. The water was then turbulently stirred to speed mixing throughout the tank. The increase in intensity at m/z 91 (beginning with the fourth peak in the series, several minutes after the addition of toluene) indicated a concentration increment equal to approximately 50 ppb according to previous measurements using standards of known concentration. If the toluene had been evenly dispersed throughout the 30,000-1 tank, the expected concentration change would be 100 ppb. The variation in m/z 91 peak intensity after dispersion of the toluene is larger than the typical statistical variation of the system and is attributed to small local concentration variations from turbulent mixing of the tank water. These measurements demonstrated the operational viability of the underwater mass spectrometry system and confirmed the system's sensitivity to small VOC concentration variations.

In order to demonstrate autonomous operation, the underwater quadrupole MS system was installed on the Florida Atlantic University (FAU) Ocean Explorer (OEX) autonomous underwater vehicle (AUV). The MS system was powered using two lead-acid battery packs (240 watt-hours each) that allow up to 5 h of continuous system operation. A valve-control software program was created to cycle the flow injection valve and automatically inject samples during AUV operation. This software operates using the embedded PC in parallel with the Transpector data acquisition software. A cycle period of 12 min was chosen for compatibility with typical flow-injection peak widths, which are primarily determined from diffusion rates through the membrane interface.

In collaboration with FAU personnel, the mass spectrometer/AUV assembly was successfully deployed on three separate routes over the course of two days. The AUV deployment and retrieval platform was the R/V Subchaser (10.7 m). The first AUV deployment, in Bayboro Harbor (adjacent to the USF College of Marine Science, St. Petersburg, Fla.), lasted for approximately 1 h. The second of two subsequent deployments (Tampa Bay) lasted for more than 3 h. The data from each of these runs, however, showed no substantial evidence of VOC contamination above the ppb detection limits of the system. Nonetheless, these tests demonstrated, over periods of several hours, the first autonomous operation of an AUV-deployed mass spectrometer.

Figure 8:
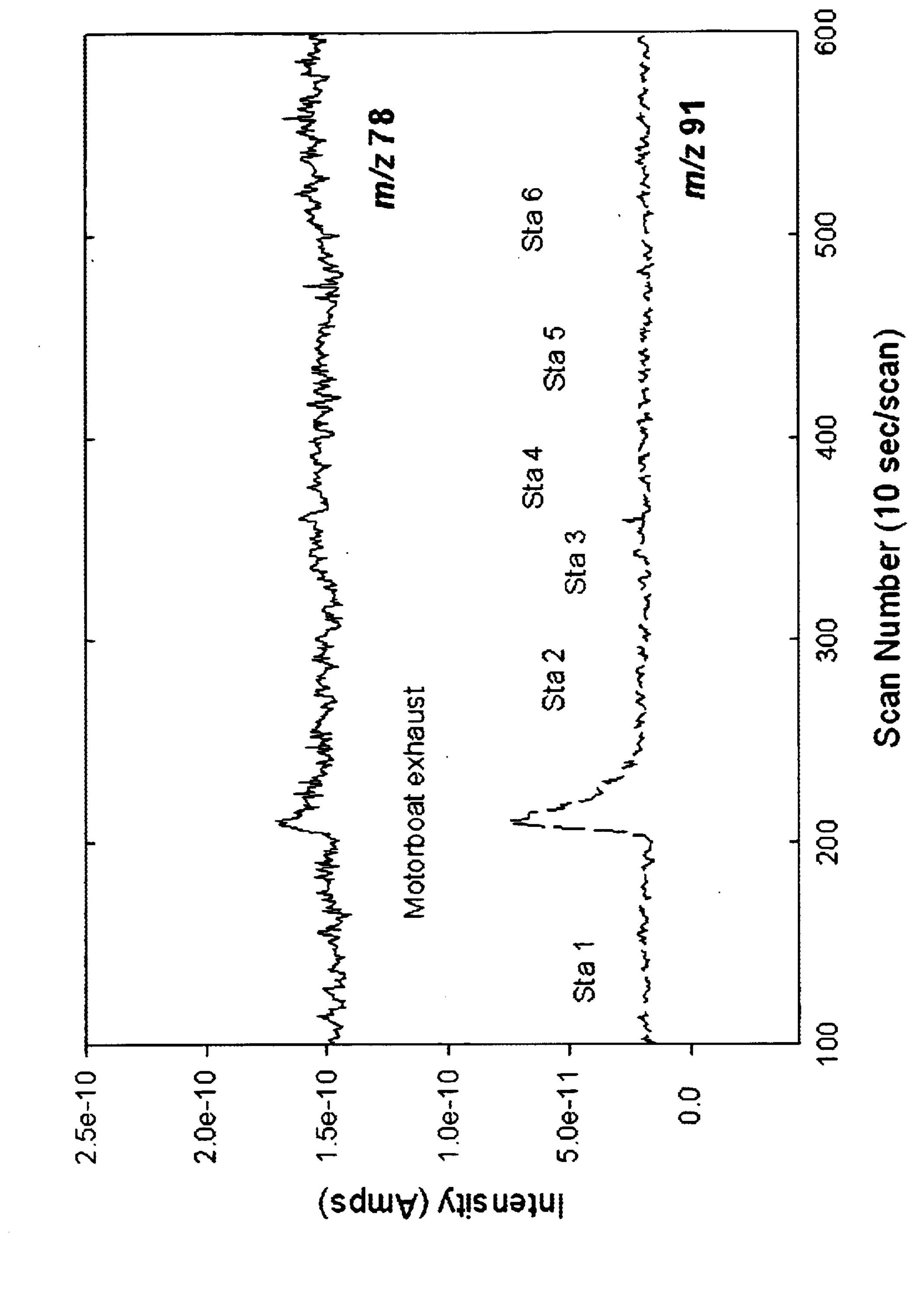
FIG. 8 plots field data from a towed underwater deployment of the quadrupole MS system in Bayboro Harbor. The m/z 78 ion is diagnostic of benzene, and the m/z 91 ion is diagnostic of toluene. Sta #s represent locations where Harbor water was analyzed. The single peak in each ion trace corresponds to analysis of water contaminated with outboard motor exhaust.

The underwater mass spectrometry system was also towed behind a small boat in Bayboro Harbor for collection of in situ MS data. The boat was propelled by a battery-powered trolling motor to avoid gasoline-exhaust contamination of the water being sampled by the underwater MS. Our towed operations allowed sampling in areas that are inaccessible to present generation AUVs (e.g., narrow creeks and crowded marinas). Flow-injection data were acquired by allowing the underwater MS to analyze samples at a number of specific locations. In situ results for two selected masses, m/z 78 and m/z 91, are shown in FIG. 8.

Sample locations are denoted as "Sta #" in the figure. There was no significant increase above background for these compounds (nor any other monitored masses) at any of the locations. The only detectable increase was observed when a gasoline-powered outboard motor was running nearby. This is shown by the increase in both traces between Sta 1 and Sta 2. The m/z 78 and m/z 91 ions are diagnostic of benzene and toluene, respectively, which are VOC components of typical gasoline mixtures. Water samples were also collected concurrently at each location for subsequent laboratory analysis using a membrane-introduction ion trap mass spectrometer with lower detection limits than the quadrupole system (see discussion below).

Figure 9:
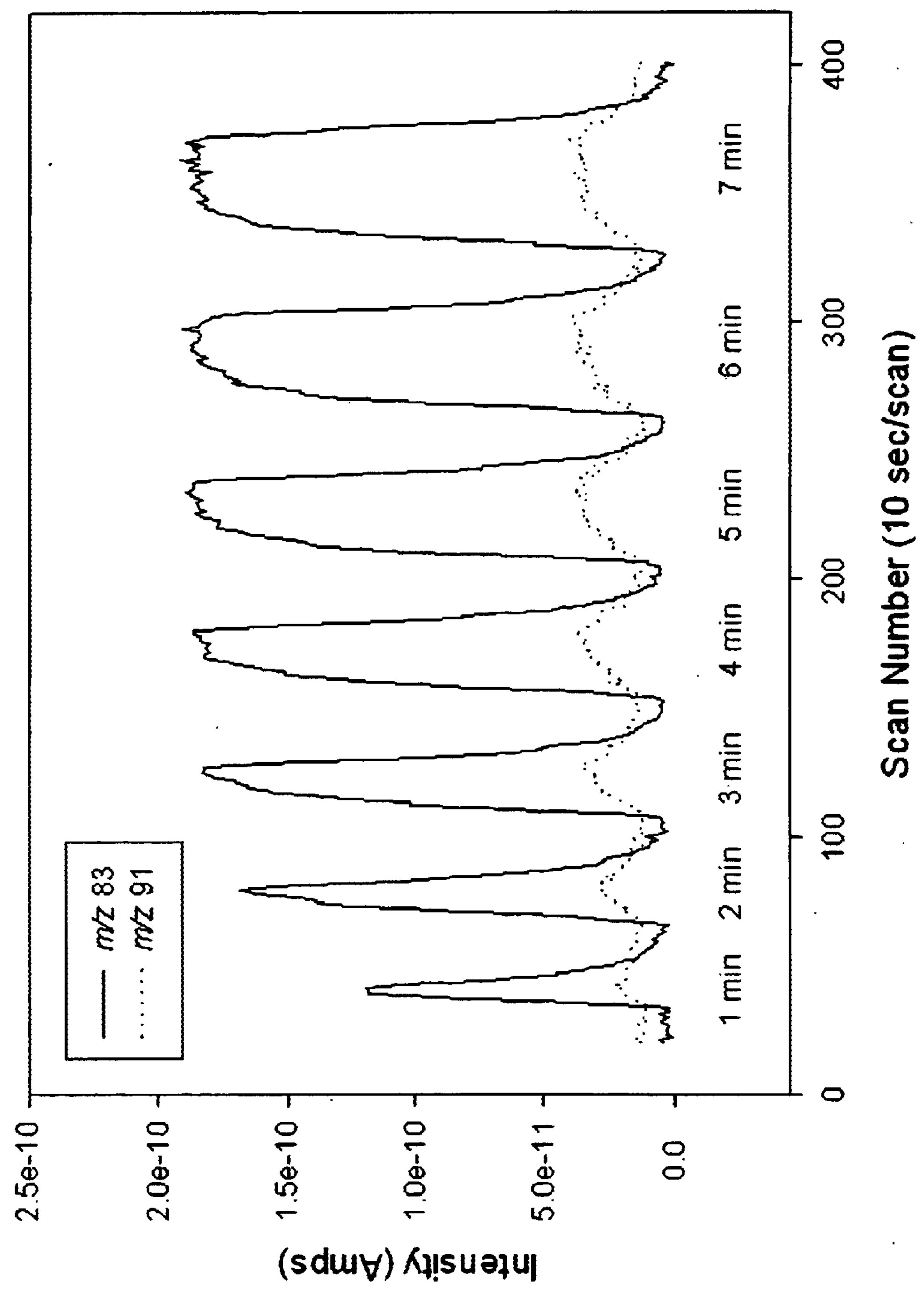
FIG. 9 plots in situ data obtained using the quadrupole MS system, demonstrating variable-volume sampling. The sample volume analyzed is determined by pumping speed (1 ml/min) and dwell time in the sampling position (noted in the figure for each peak). Deionized water is analyzed between samples.

All the analyses presented above were obtained using a flow-injection valve with a fixed-volume sample loop. What is now believed to represent the best embodiment of the system replaces this valve with one that contains no sample loop, and uses a fluid-stream switching approach to introduce samples. The volume of sample analyzed using the new valve is solely determined by the water pumping speed and the time the valve remains in position for sample analysis. Accordingly, the volume of deionized water analyzed in the second valve position is also dependent only on pumping speed and time. This new valve thus allows the sample volume to be continuously varied and adapted to analyte acquisition conditions. This capability is illustrated in FIG. 9, which shows m/z 83 and m/z 91 ion traces for in situ analyses of the municipal water in the COT water tank. With a pumping speed of 1 ml/min, as used for these analyses, the sample volume was varied in 1-ml sample steps from 1 to 7 ml by changing sample position dwell time. From these measurements it is clear that a 1-ml sample (1 min dwell time) does not provide optimum single-to-noise ratios for quantification of these compounds. Maximum peak height is not reached until a 3-ml sample (3-min dwell time) is introduced. A steady-state peak intensity is seen for analysis of samples greater than 3 ml. This capability allows rapid field adaptation of sampling strategies in response to observations. The system also facilitates fundamental studies of membrane transmission properties.

Additional Embodiments

An alternate embodiment of the system 10' comprises an ion-trap mass spectrometer 11' (FIG. 13) instead of a quadrupole mass filter 11. The ion trap 11' has greater sensitivity than the quadrupole mass filter 11 because of its ion storage and isolation capabilities and is unsurpassed in its ability to perform multiple stages of mass spectrometry (e.g., MS/MS and $MS^n$). In addition, the ion trap 11' has been shown to be very effective for characterization and detection of targeted compounds in complex samples, for which chemical noise (compounds with the same nominal mass) can hinder molecular identification.

The ion trap 11' also has many features desirable for use in a portable system: the mass analyzer itself is smaller than a standard quadrupole mass filter, and the vacuum requirements are even less stringent (by more than an order of magnitude) than those for other mass spectrometers. The biggest obstacle to deployment as an in situ mass spectrometer is the complexity and format of the associated electronics and control software.

Figure 13:
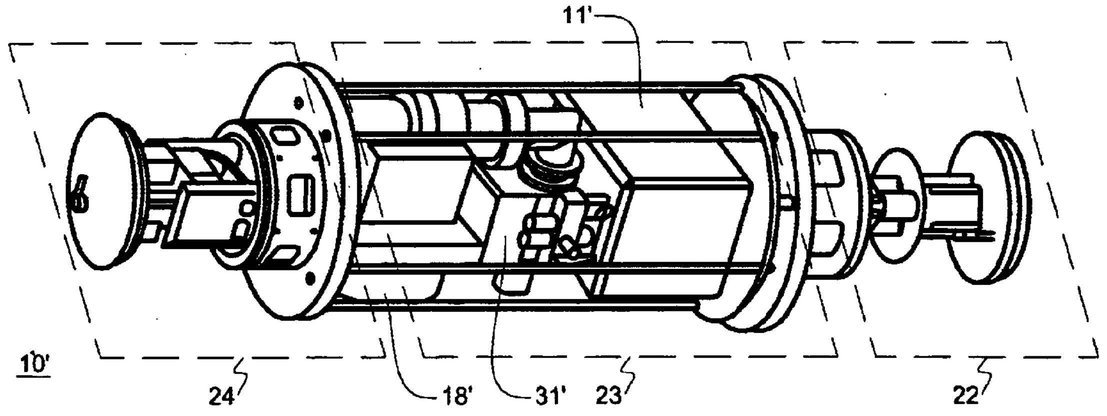
FIG. 13 is a schematic of a three-pressure vessel system for the underwater membrane-introduction ion-trap mass spectrometer system. The first and third vessels are substantially identical to those used on the quadrupole mass filter system.

The system 10' illustrated in FIG. 13 comprises a modified Saturn 2000 Ion Trap Mass Spectrometer 11' (Varian Analytical, Walnut Creek, Calif.) combined with a membrane interface that is functionally substantially identical to that used in the quadrupole mass filter system 10 and packaged for underwater use. The membrane interface is attached to the ion-trap vacuum housing 11' at the location normally occupied by a gas chromatograph (GC) transfer line. In this manner analytes that diffuse out of the membrane are forced to enter the ion trap, where they are subsequently ionized. Helium buffer gas is not used in this arrangement since neutral water vapor and dinitrogen serve as sufficient collision gases for the nonpolar species introduced through the membrane. The modular mass spectrometer system design 10' facilitates the use of substantially the same fluidic and diaphragm pump modules 22,24 as described above with the quadrupole system 10. However, as seen in FIG. 13, the ion-trap pressure vessel 23' is slightly larger than that 23 of the quadrupole mass filter system 10. In order to fit the Satum 2000 ion-trap MS inside the 0.31-m-diameter pressure vessel, several modifications of the system were made. A redesigned and miniaturized power distribution board 37 was configured for 24 Vdc operation. The waveform generation board (SAPWAVE) was redesigned as two smaller boards. The V70 turbomolecular pump was replaced with a V70LP turbo-drag pump 19, and the vacuum system was reconfigured to fit within the 0.3-m-diameter tube. The pump was changed in order to enable the use of smaller roughing pumps; in the present embodiment the roughing pumps are diaphragm pumps. The embedded computer for data acquisition comprises a Cell Computing (San Jose, Calif.) modular Plug-N-Run PII 333-MHZ PC System with an IBM 340-MB Microdrive. The embedded PC communicates with the Saturn 2000 system via a National Instruments PCMCIA GPIB (Personal Computer Memory Card International Association, General Purpose Interface Bus) interface card. The entire system, including flow injection components and diaphragm pumps, weighs approximately 68 kg in air, is nearly neutrally buoyant in water, and is 1.35 m in length. During operation is consumes on the order of 150 W.

Typical operational parameters of the reconfigured Saturn 2000 Ion Trap MS for membrane interface flow injection analyses are as follows, although these are not intended as limitations: Electron emission current is in the range of 5–30 $\mu$A depending upon the application. Ionization is performed with a 35-amu low-mass cutoff to exclude the water vapor and nitrogen ions that are introduced through the membrane. Average mass scans from 40 to 250 amu are plotted every 5 s during analyses. The mass spectral acquisitions are limited to this range because the transmission characteristics of the membrane set a practical upper analysis limit of around 300 amu. Automatic gain control (AGC) is used with an rf ramp to eject ions up to 650 amu before each ionization period and mass scan. The target ion count for AGC is set well above the anticipated ion count to ensure that the entire 60-ms ionization time is used for trace analysis. Water is heated to 35° C. in the membrane introduction probe, a lower value than used for the quadrupole system. The ion-trap manifold heater is set to 50° C., while the trap heater is held at 80° C. These temperatures provided an optimized signal-to-noise ratio for trace VOC analysis in water.

Figure 10:
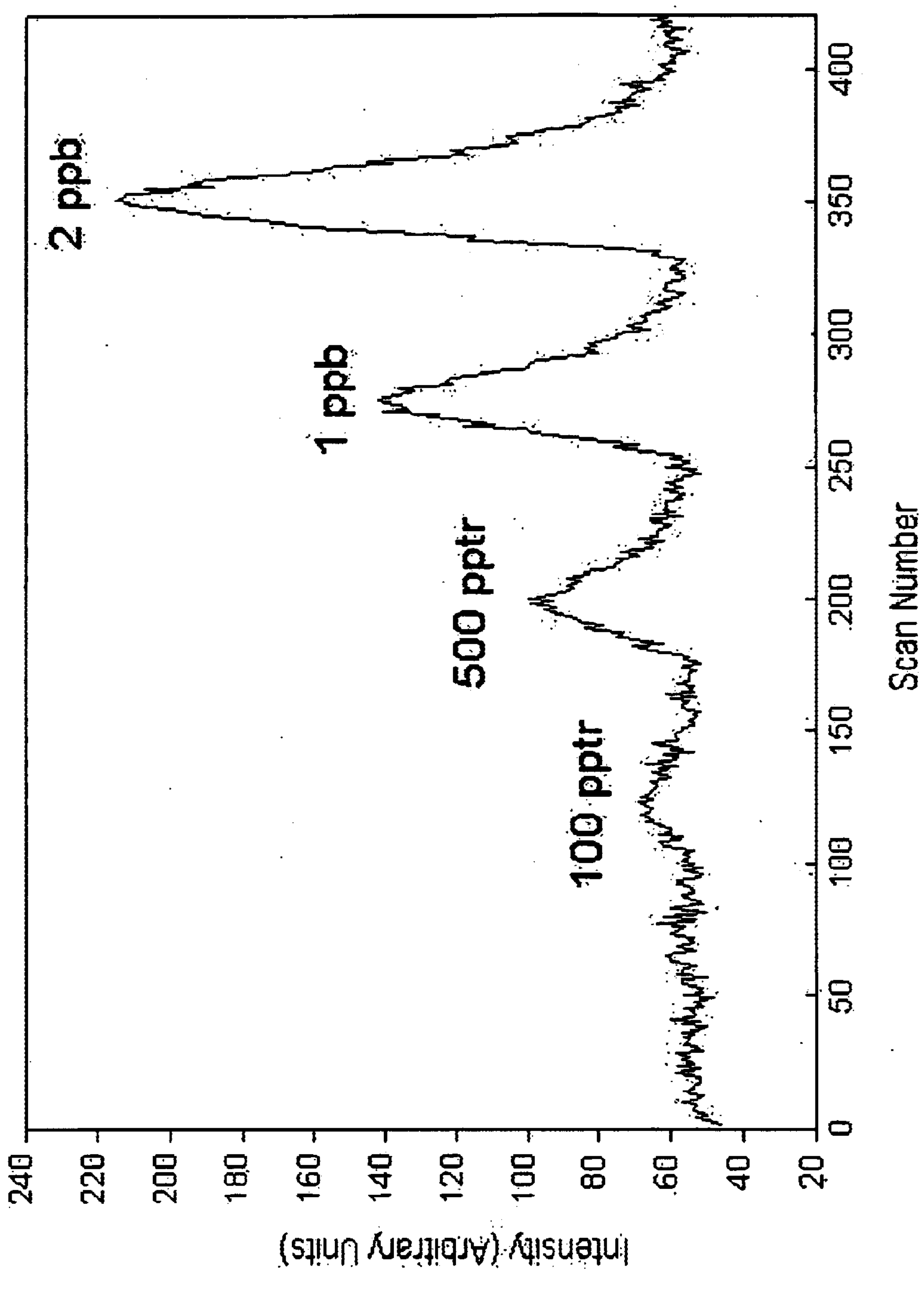
FIG. 10 shows data for the flow-injection analysis of toluene using an ion-trap mass spectrometer system, a second embodiment of the system of the present invention.

Because of the ion trap's superior analytical capabilities, it has been tested in an alternate embodiment of the system 10'. Data were collected with an ion-trap mass spectrometer 11' (Varian, Model Saturn 2000, Walnut Creek, Calif.) using the membrane-probe and flow-injection system described above, with the intensity of the m/z 91 ion plotted as a function of the scan number (FIG. 10). Each scan takes 5 s. The data demonstrate that there is a detection limit of less than 100 parts per trillion (pptr) for toluene, which represents at least an order of magnitude improvement over the quadrupole mass filter 11.

Both embodiments 10,10' of the system have limited mass ranges. The first embodiment 10 gas analyzer has an upper mass limit of 100 amu (300-amu versions are also available), and the second embodiment 10' has an upper limit of 650 amu. These limits are not believed to represent a problem for the system, however, since the membrane properties limit the mass of compounds that cross the membrane to approximately 300 amu. Other sample-introduction techniques do not have these limitations, and there are many biologically important compounds with masses well in excess of 650 amu. Consequently, since membrane introduction gives access to only <10% of compounds currently of interest in the water column, alternate introduction methods may be contemplated.

In order to avoid mass-analyzer limitations, time-of-flight (TOF) mass spectrometry may be evaluated on an AUV platform. TOF mass spectrometers inherently have high sensitivity and a very high mass range. Traditionally, they are large instruments, but smaller versions with a footprint compatible with the OEX AUV are commercially available, such as the Comstock MiniTOF (Oak Ridge, Tenn.). The associated electronics and software are relatively simple compared with those of the ion-trap mass spectrometer. TOF mass spectrometers, however, do not typically have MS/IMS capability.

Atmospheric-pressure ionization in the form of electrospray ionization (ESI) has been shown to be a very efficient and gentle means of transporting involatile species from solution to the gas phase for mass-spectral analysis (S. McLuckey et al., *Anal Chem.* 66, 737A-43A, 1994; L. Voress, *Anal. Chem.* 66, 481-A–86A, 1994). The technique is particularly efficient for very polar or ionic species in the water column and is used extensively in the laboratory for investigations of large, biologically important molecules, such as proteins and peptides. It is anticipated that ESI may be coupled with the ion-trap and TOF mass spectrometers for in situ analysis of seawater. Instrumental and chemical complexities are more serious than those encountered using membrane-introduction techniques. However, the detection and identification of biologically important molecules, as well as characterization of trace metal species, is believed to be an important feature to perfect. Possible difficulties owing to seawater's high salt content are currently being addressed.

In addition to a deployment of a standalone sensor comprising the mass-spectrometry system on an AUV, an integrated AUV sensor system is also contemplated. For example, the Ocean Explorer vehicle uses an intelligent distributed-control system made by Echelon Corp., LONWorks (L. C. Langebrake et al., *Proc. Oceanology* 98, "The Global Ocean," *Bringhton* 3, 129–48, 1998). This system allows multiple sensor payloads to be connected in a simple yet versatile network. Each sensor acts as a node and can communicate over the network. At the same time each sensor can contain software and hardware that are adapted to permit independent operation. Deployment of additional underwater sensors is also contemplated. Such a suite of sensors are believed to have the ability to provide valuable complementary data for comprehensive chemical characterization of the water column.

Acoustic emissions from the mechanical pumps are anticipated as a noise source contributing to the overall vehicle self-noise. Spectrophotometric sensors are not anticipated to have problems in this environment. For a noise-sensitive sensor such as an acoustic modem, however, the vehicle-radiated noise is characterizable, and both the placement and frequency of operation of a receiver or projector may be optimized to reduce interference from any mechanical noise source.

Compelling motivation for development of an underwater ion trap MS system 10' arose from predicted performance gains and laboratory measurements that routinely exhibited detection limits 20 times better than those of the quadrupole system 10. The ion trap system 10' also offers additional advantages relative to the quadrupole system 10, such as full mass scans for each analysis, extended mass range, and MS/MS capability. It should be noted, however, that the space-charge limitations of the ion trap MS require that ionized water and the ionized $N_2$ be excluded from the trap. This was accomplished by using a low-mass cutoff (35 amu) during ionization periods. This operational necessity makes the ion-trap system 10' inappropriate for analysis of low-molecular-weight compounds (below ca. 40 amu). In contrast, the quadrupole membrane introduction mass spectrometry (MIMS) system does not have such severe space-charge limitations and can detect low-molecular-weight gases, in principle, down to molecular hydrogen.

Figure 11:
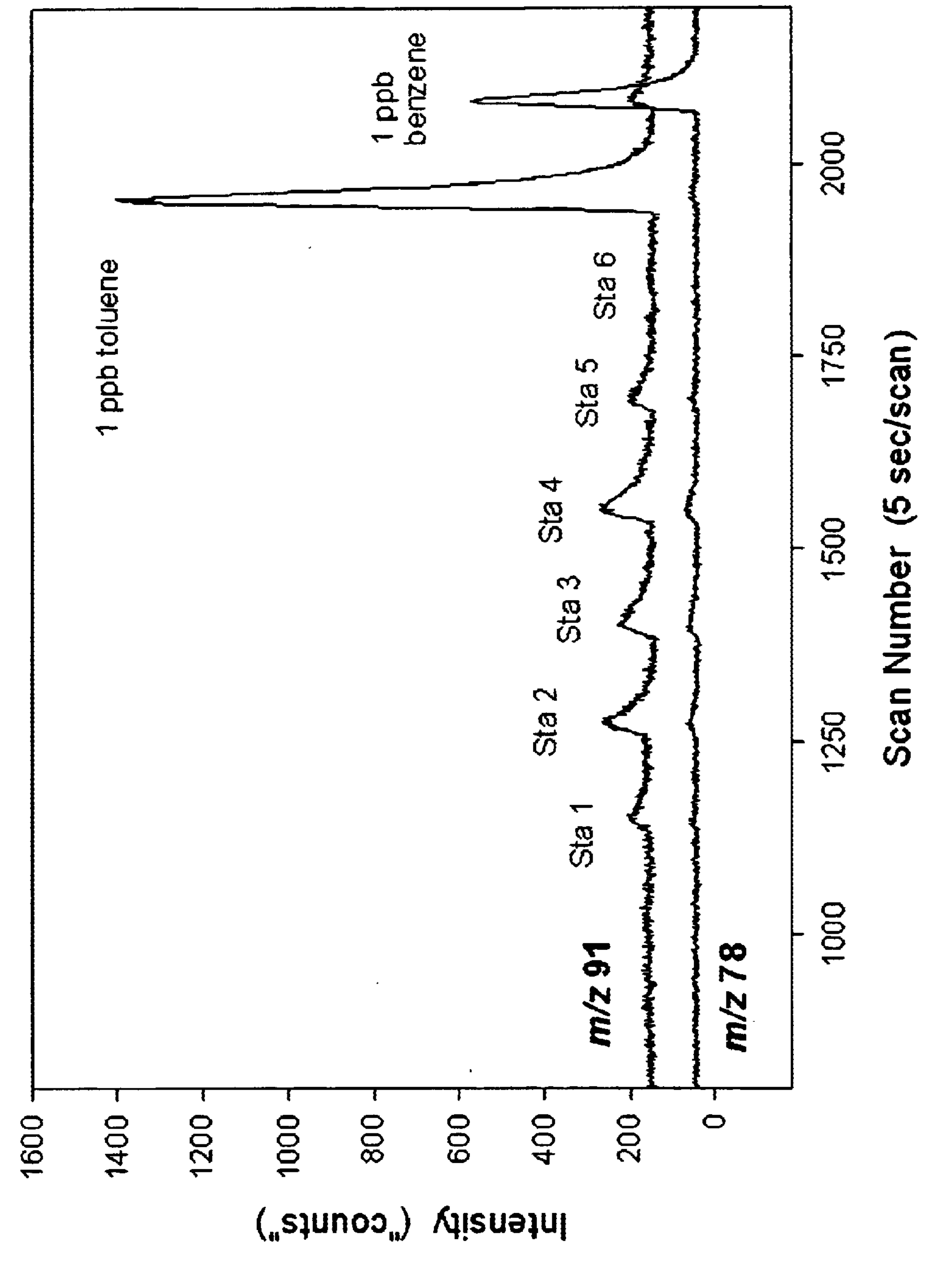
FIG. 11 plots laboratory data from ion-trap MS analysis of water samples that were obtained during towed deployment of the quadrupole MS system. The m/Z 78 ion is diagnostic of benzene, and the m/z 91 ion is diagnostic of toluene. Analyses of samples are compared with 1-ppb standards.

As a demonstration of the improved sensitivity of the ion-trap system 10', laboratory analyses of water samples collected from Bayboro Harbor during towed deployment of the underwater quadrupole MS system are shown in FIG. 11. Although the quadrupole in situ measurements failed to detect VOCs in the Harbor, laboratory ion-trap measurements clearly show the presence of ions m/z 78 and m/z 91, which are diagnostic of benzene and toluene. At the end of each trace a peak corresponding to injection of 1-ppb standards of these two compounds is shown for comparison. Peak intensities for the collected water samples thus correspond to concentrations well below 1 ppb in each case. These results are consistent with those obtained using the in situ quadrupole system, which has a detection limit in the 1–5-ppb range.

An underwater deployment of the ion trap system on the OEX AUV in Tampa Bay used procedures similar to those developed in previous quadrupole system AUV deployments. In situ membrane-introduction ion trap data were collected on four separate deployments, each lasting from 0.5 to 2 h. One of the AUV/MS deployments involved a point-source release of 181 of dimethylsulfide (DMS) in Tampa Bay. The AUV was programmed to traverse a "lawn-mower" pattern across the expected DMS plume. The fluid-switching valve was set to continuously direct bay water to the membrane introduction interface (no deionized water was used in these measurements). There was at least one peak in the data sets for m/z 62 and m/z 9, and possible minor peaks. These peaks appear at different times in the deployment, which is more consistent with real chemical concentration changes rather than instrumental fluctuations. These data sets are being correlated with AUV position and modeled distribution of DMS.

It is believed that these measurements constitute the first underwater chemical observations obtained using an ion-trap mass spectrometry system. Additional deployments of both the quadrupole and ion-trap MS systems are planned on autonomous and remotely controlled mobile platforms, as well as towed and moored platforms. These deployments are planned to take place in a variety of aqueous systems, including fresh water, saltwater, and wastewater treatment facilities.

It may be appreciated by one skilled in the art that additional embodiments may be contemplated, including alternate underwater or aqueous environments and alternate embodiments of components of the system.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

All of the forgoing U.S. Patents and other publications are each expressly incorporated by reference herein in their entireties.

What is claimed is:

1. A mass spectrometer adapted for underwater use comprising:

a watertight case having a fluid sample inlet;

a fluid control system adapted to acquire a fluid sample from an aqueous environment for delivery into the watertight case, the fluid control system positioned within the watertight case and in fluid communication with the sample inlet;

means for transforming an analyte molecule in the fluid sample from a liquid phase into a gas phase positioned within the watertight case;

means for directing the fluid sample to the transforming means from the acquiring means;

a mass analyzer housing positioned within the watertight case, the mass analyzer housing in fluid communication with the transforming means;

a quadrupole mass filter positioned within the mass analyzer housing; and a vacuum pump system adapted to establish a vacuum within the mass analyzer housing, the vacuum pump system positioned within the watertight case and in fluid communication with the mass analyzer housing.

2. The mass spectrometer recited in claim 1, wherein the transforming means further comprises an introduction probe comprising a membrane having selective transport properties.

3. The mass spectrometer recited in claim 2, wherein the membrane has selective transport properties for nonpolar compounds.

4. The mass spectrometer recited in claim 3, wherein the membrane comprises polydimethylsiloxane.

5. The mass spectrometer recited in claim 1, further comprising means for regulating a temperature of the fluid sample along the directing means.

6. The mass spectrometer recited in claim 1, further comprising a first reservoir for holding a control fluid, and wherein the fluid control system comprises a pump having means for selectively directing fluid from the first reservoir to the transforming means.

7. The mass spectrometer recited in claim 1, wherein the analyzing means further comprises a computer in electronic communication with the mass filter for controlling data acquisition of the mass filter and for performing analysis of data collected by the mass filter.

8. The mass spectrometer recited in claim 1, wherein the pump system comprises a turbo-molecular drag pump and two diaphragm pumps connected in series.

9. The mass spectrometer recited in claim 8, further comprising means for dissipating heat generated by the pump system.

10. The mass spectrometer recited in claim 10, wherein the heat dissipating means comprises a heat sink plate in thermal contact with a heat-conducting material in contact with the watertight case, such that the surrounding aqueous environment affects the heat dissipation.

11. The mass spectrometer recited in claim 1, wherein the watertight case comprises a first and a second watertight cases, the transforming means and the analyzing means-residing in the second case, and fluid control system residing in the first case.

12. The mass spectrometer recited in claim 1, wherein the transforming means comprises an atmospheric pressure ionization device.

13. The mass spectrometer in claim 12, wherein the pressure ionization device comprises an electrospray ionization device.

14. The mass spectrometer recited in claim 11, further comprising a third watertight case, the pump system positioned within the third case.

15. A modular, submersible mass spectrometry system comprising a plurality of sealed substantially fluid-tight pressure vessels for operating in an aqueous environment, the system comprising:

a substantially fluid-tight fluid control pressure vessel containing:

a sample inlet from an aqueous environment and an outlet to an exterior of the fluid control pressure vessel; and a fluid control system adapted to acquire a fluid sample from an aqueous environment delivery into the watertight case, the fluid control system comprising a pump in fluid communication with a control fluid and a sample fluid having a means for selectively pumping the control fluid and the sample fluid to the outlet;

a substantially fluid-tight mass spectrometer pressure vessel containing:

an introduction probe in fluid communication with the fluid control pressure vessel outlet for transforming an analyte gas molecule present in fluid therefrom comprising a membrane having selective transport properties for nonpolar volatile compounds, the introduction probe for transforming an analyte gas molecule present in fluid from the fluid control pressure vessel outlet from a liquid phase into a gase phase;

a fluid line for establishing fluid communication between the fluid control pressure vessel outlet and the introduction probe;

a linear quadrupole mass filter in fluid communication with the introduction probe for collecting data on the gas-phase analyte molecule; and data analysis means for receiving the data collected by the mass filter and performing an analysis thereof to determine an identity of the gas-phase analyte molecule;

a substantially fluid-tight roughing pump pressure vessel containing a vacuum pump system for providing low-pressure conditions in the mass filter, and a line connecting the vacuum pump with the mass filter.

16. The system recited in claim 15, wherein the introduction probe membrane comprises polydimethylsiloxane.

17. The system recited in claim 15, further comprising means for regulating a temperature of the fluid pumped to the introduction probe.

18. The system recited in claim 15, wherein the data analysis means comprises a computer in electronic communication with the mass filter having software resident thereon for controlling data acquisition of the mass filter and for performing analysis of data collected by the mass filter.

19. The system recited in claim 15, wherein the vacuum pump comprises two diaphragm pumps connected in series, and further comprising a turbo-molecular drag pump housed within the mass spectrometer vessel and in communication with the line between the two diaphragm pumps and the mass filter.

20. The system recited in claim 15, further comprising means for dissipating heat generated by the vacuum pump.

21. The system recited in claim 20, wherein the heat dissipating means comprises a heat sink plate positioned within the roughing pump pressure vessel in thermal contact with a heat-conducting material in contact with the roughing pump pressure vessel such that the surrounding aqueous environment affects the heat dissipation.

22. A method for identifying a molecule in an aqueous environment comprising the steps of:

acquiring a fluid sample from an aqueous environment;

delivering the fluid sample into a substantially watertight case, through a sample inlet;

directing the fluid to a transforming means;

transforming an analyte molecule in the fluid from a solution phase into a gas phase within the case; and analyzing the analyte molecule using a linear quadrupole mass filter to determine an identify thereof.

23. The method recited in claim 23, wherein the transforming step comprises using an introduction probe comprising a membrane having selective transport properties for nonpolar volatile compounds.

24. The method recited in claim 23, wherein the membrane comprises polydimethylsiloxane.

25. The method recited in claim 23, further comprising regulating a temperature of the fluid directed to the introduction probe.

26. The method recited in claim 22, wherein the directing step comprises selectively directing fluid from each of a control fluid and the sample fluid source to the transforming means.

27. The method recited in claim 22, wherein the analyzing step further comprises using a computer in electronic communication with the mass filter for controlling data acquisition of the mass filter and for performing analysis of data collected by the mass filter.

28. The method recited in claim 22, further comprising providing a vacuum within a housing surrounding the mass filter.

29. The method recited in claim 28, wherein the pumping step comprises using a turbo-molecular drag pump and two diaphragm pumps connected in series.

30. The method recited in claim 22, further comprising dissipating heat-generated by the pump.

31. The method recited in claim 30, wherein the heat dissipating step comprises using a heat sink plate in thermal contact with a heat-conducting material in contact with the case.

32. A method for making a mass spectrometer adapted for underwater use comprising the steps of:

positioning a means for transforming an analyte molecule from a solution phase into a gas phase within a watertight case having an inlet;

positioning a means for acquiring a fluid sample from an aqueous environment for delivering into it watertight case;

directing the fluid sample to the transforming means from the acquiring means within the case;

positioning a linear quadrupole mass filter for analyzing the gas-phase analyte molecule to determine an identify thereof within the case; and surrounding the mass filter with a housing and providing a vacuum within the mass filter housing.

33. The method recited in claim 32, wherein the transforming means comprises an introduction probe comprising a membrane having selective transport properties for nonpolar volatile compounds, the membrane positioned between the directing means and the analyzing means.

34. The method recited in claim 33, wherein the membrane comprises polydimethylsiloxane.

35. The method recited in claim 32, further comprising the step of positioning a means for regulating a temperature of the fluid along the directing means within the case.

36. The method recited in claim 32, further comprising the step of positioning a first reservoir for holding a control fluid and a second reservoir for holding waste fluid within the case, and wherein the directing means positioning step comprises affixing a pump having means for selectively directing fluid from the first reservoir to the transforming means within the case.

37. The method recited in claim 32, further comprising affixing a computer within the case and establishing electronic communication between the computer and the mass filter, the computer for controlling data acquisition of the mass filter and for performing analysis of data collected by the mass filter.

38. The method recited in claim 32, further comprising dissipating heat generated within the case.

39. A method for making a modular, submersible mass spectrometry system comprising a plurality of sealed, substantially fluid-tight pressure vessels for operating in an aqueous environment, the method comprising the steps of:

positioning within a substantially fluid-tight fluid control pressure vessel:

a sample inlet from an aqueous environment and an outlet to an exterior of the fluid control pressure vessel; and a fluid control system adapted to acquire a fluid sample from an aqueous environment for delivery into the watertight case, the fluid control system comprising a pump in fluid communication with a control fluid and a sample fluid having a means for selectively pumping the control fluid and the sample fluid to the outlet;

positioning within a substantially fluid-tight mass spectrometer pressure vessel:

an introduction probe in fluid communication with the flow injection pressure vessel outlet for transforming a gas molecule present in fluid therefrom comprising a membrane having selective transport properties for nonpolar volatile compounds, the introduction probe for transforming an analyte molecule present in fluid from the fluidic control pressure vessel outlet from a liquid phase into a gas phase;

a fluid line for establishing fluid communication between the fluidic control pressure vessel outlet and the introduction probe;

a linear quadrupole mass filter in fluid communication with the introduction probe for collecting data on the gas-phase analyte molecule; and data analysis means for receiving the data collected by the mass filter and performing an analysis thereof to determine an identity of the gas-phase analyte molecule;

positioning within a substantially fluid-tight pump vessel a vacuum pump for providing low-pressure conditions in the mass filter; and connecting the vacuum pump with the mass filter.

40. The method recited in claim 39, wherein the introduction probe membrane comprises polydimethylsiloxane.

41. The method recited in claim 39, further comprising the step of positioning within the fluidic control pressure vessel a means for regulating a temperature of the fluid pumped to the introduction probe.

42. The method recited in claim 39, wherein the data analysis means comprises a computer in electronic communication with the mass filter having software resident thereon for controlling data acquisition of the mass filter and for performing analysis of data collected by the mass filter.

43. The method recited in claim 39, wherein the vacuum pump comprises two diaphragm pumps connected in series, and further comprising the step of positioning a turbo-molecular drag pump within the mass spectrometer vessel and between the two diaphragm pumps and the mass filter.

44. The method recited in claim 39, further comprising the step of positioning a means for dissipating heat generated by the vacuum pump within the pump vessel.

* * * * *

UNITED STATES PATENT AND TRADEMARK OFFICE
CERTIFICATE OF CORRECTION

PATENT NO. : 6,744,045 B2
APPLICATION NO. : 09/971119
DATED : June 1, 2004
INVENTOR(S) : Fries et al.

It is certified that error appears in the above-identified patent and that said Letters Patent is hereby corrected as shown below:

Col. 15 line 31-35

Please replace claim 10 with the following to correct dependancy as it currently depends upon itself:

10. The mass spectrometer recited in claim 9, wherein the heat dissipating means comprises a heat sink plate in thermal contact with a heat-conducting material in contact with the watertight case, such that the surrounding aqueous environment affects the heat dissipation.

Col. 16 line 59-63

Please replace claim 23 with the following to correct dependancy as it currently depends upon itself:

23. The method recited in claim 22, wherein the transforming step comprises using an introduction probe comprising of a membrane having selective transport properties for nonpolar volatile compounds.

Signed and Sealed this

Sixth Day of April, 2010

David J. Kappos

David J. Kappos
*Director of the United States Patent and Trademark Office*